No. 873,475.

PATENTED DEC. 10, 1907.

H. WOODS.
FLUID PRESSURE VALVE.
APPLICATION FILED FEB. 10, 1905.

WITNESSES

Harry Woods INVENTOR

UNITED STATES PATENT OFFICE.

HARRY WOODS, OF STEUBENVILLE, OHIO.

FLUID-PRESSURE VALVE.

No. 873,475.　　　　Specification of Letters Patent.　　　　Patented Dec. 10, 1907.

Application filed February 10, 1905. Serial No. 245,104.

To all whom it may concern:

Be it known that I, HARRY WOODS, of Steubenville, Jefferson county, Ohio, have invented a new and useful Fluid-Pressure Valve, of which the following is a full, clear, and exact description, reference being had to the accompanying drawings, forming part of this specification, in which—

Figure 1:
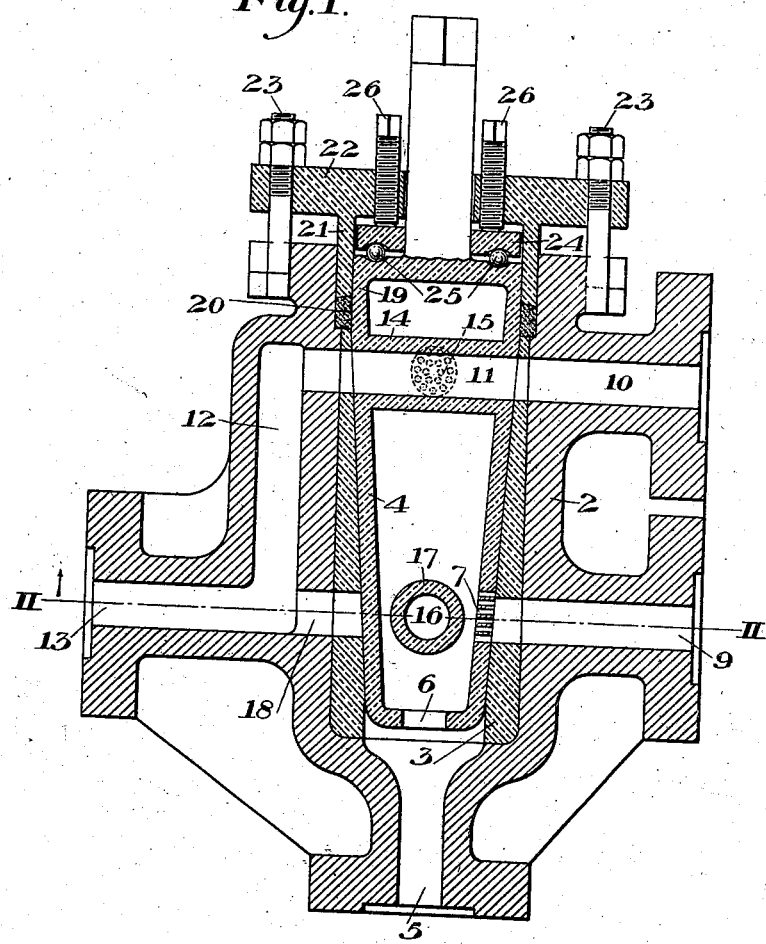
Figure 2:
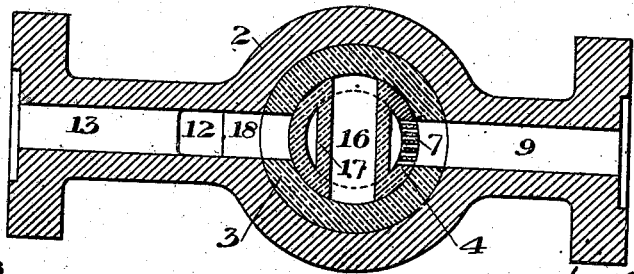

Figure 1 is a vertical longitudinal section of my improved valve, and Fig. 2 is a cross-section on the line II—II of Fig. 1 looking upwardly.

My invention relates to the valves for controlling fluid pressure, such as hydraulic valves, and is designed to provide a simple, efficient and long-lived valve of this character.

In the drawing, in which I have shown the valve as arranged to control the water passing to the opposite ends of a motive cylinder, 2 represents the valve casing having a cylindrical cavity therein which is preferably provided with a tapered bushing or lining 3. This bushing is fixed in position and in it fits the hollow tapering plug-valve 4. In the form shown the cavity in the valve is connected at its lower end to the inlet port 5 for the water, through a bottom hole 6 in the valve. This entering water fills the cavity in the valve and flows through the valve-port 7 into the casing port 9 which leads to one side of the cylinder. The water is exhausted from the other end of the cylinder through the port 10 in the casing, and the port 11 of the valve, into the branch exhaust port 12 which leads into the exhaust 13. The port 11 in the valve extends through a transverse plug or stem 14, so that this port 11 is closed off from the inner cavity of the hollow valve. The valve is also provided in its upper portion with a port 15 which may be brought into registry with the port 10; and in its lower portion is a transverse port 16 formed in a through-plug 17 similar to the plug 14. When the valve is turned to bring the port 16 into registry with the port 9 and the branch exhaust 18, the port 15 will be in registry with the port 10. In this position of the parts the water will flow into the hollow valve, thence through the ports 15 and 10 to the cylinder; while the exhaust will flow back through the ports 9, 16 and 18 to the exhaust 13.

In order to reduce the cutting action in the valve supply ports 7 and 15, I preferably form these ports as a succession of small holes over the port area; though this feature may or may not be used as desired.

The upper portion 19 of the plug valve is preferably cylindrical and is packed by the flexible packing 20 which is compressed by the ring 21 on the follower 22. This follower is forced in by bolts 23. In order to reduce the friction to the turning of the valve, I preferably form its upper end with a circular ball-race and provide a circular plate 24 having a similar ball-race. The balls 25 are placed between the upper end of the valve and the plate, and the valve may be adjusted by the screws 26 passing through the follower and contacting with the plate. The upward pressure of water entering the valve will force it against this ball-bearing, which renders the turning more easy.

The advantages of my invention result from doing away with the cup leathers and similar packing devices of hydraulic and fluid pressure valves, and providing a valve which is simple, may be easily and cheaply made, and will be long-lived.

The valve may be made with three ports for a single-acting cylinder, and more ports may be provided if desired; and many other changes may be made in the form and arrangement of the parts without departing from my invention.

I claim:—

1. In a fluid pressure valve, a hollow valve body having a continuously open port leading thereinto, said valve body having transverse through-ports at different angles and cut off from its interior, and ports extending through the valve wall and communicating with its interior; substantially as described.

2. A valve comprising a casing having a valve socket provided at one end with an enlargement, a hollow turning plug working in the socket and provided with an inlet opening in that end which is opposite the enlargement of the socket, a packing gland fitting in the enlarged portion of the socket and embracing the valve, and a thrust bearing interposed between the gland and the plug in opposition to the force of the incoming fluid, substantially as described.

3. A valve comprising a casing having a valve socket provided at one end with an enlargement, a hollow turning plug mounted in the valve socket and provided with an inlet opening in that end which is opposite the enlarged portion of the socket, a packing gland embracing the other end of the valve and fitting in the enlarged portion of the socket, a bearing plate interposed between the back of the gland and the adjacent end of the valve, antifriction devices interposed between the plate and the valve, and adjusting screws piercing the gland and in coöperative relation with the bearing plate, substantially as described.

4. A valve comprising a casing having a valve socket provided with pairs of diametrically opposite ports, a hollow turning plug mounted in the socket, corresponding ends of the socket and the plug having inlet openings in continuous communication with one another, a pair of through ports piercing the plug at different angles and cut off from the interior of the plug, said through ports being disposed for successive communication with the respective pairs of ports of the casing, and the valve plug being provided with ports extending through one wall only of the plug and in the transverse plane of the respective through ports for successive communication with the ports of the casing, substantially as described.

In testimony whereof, I have hereunto set my hand.

HARRY WOODS.

Witnesses:
PHIL PASTRE,
WM. S. McCAUSLEN.